United States Patent
Bonvallat et al.

(10) Patent No.: US 7,828,567 B2
(45) Date of Patent: Nov. 9, 2010

(54) CARRIER AND AN ASSEMBLY INCLUDING A CARRIER AND A TELECOMMUNICATIONS MODULE

(75) Inventors: Pierre Bonvallat, Shanghai (CN); Guy Metral, Cluses (FR); Gaetan Perrier, Saint Jorioz (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/782,406

(22) Filed: Jul. 24, 2007

(65) Prior Publication Data

US 2007/0264852 A1    Nov. 15, 2007

Related U.S. Application Data

(62) Division of application No. 11/247,400, filed on Oct. 11, 2005, now abandoned.

(51) Int. Cl.
*H01R 3/00* (2006.01)
(52) U.S. Cl. ............... 439/165; 439/131; 439/713; 439/719
(58) Field of Classification Search .......... 439/713, 439/131, 165, 31, 719
See application file for complete search history.

(56) References Cited

U.S. PATENT DOCUMENTS

| | | | |
|---|---|---|---|
| 3,992,654 A * | 11/1976 | Springer et al. | ............ 361/680 |
| 4,160,880 A | 7/1979 | Brey | |
| 4,766,521 A | 8/1988 | Pelletier | |
| 4,839,939 A * | 6/1989 | O'Brien, II | .................. 16/223 |
| 4,944,694 A | 7/1990 | Dorn | |
| 5,093,885 A | 3/1992 | Anton | |
| 5,127,842 A * | 7/1992 | Kelly | .......................... 439/165 |
| 5,146,650 A * | 9/1992 | Robertson | ..................... 16/259 |
| 5,390,075 A * | 2/1995 | English et al. | .............. 361/683 |
| 5,581,440 A * | 12/1996 | Toedter | .................... 361/683 |
| 5,727,960 A * | 3/1998 | Zehrung | ..................... 439/165 |
| 5,800,187 A * | 9/1998 | Vermon et al. | ................. 439/92 |
| 5,816,854 A | 10/1998 | Baggett et al. | |
| 5,887,106 A * | 3/1999 | Cheeseman et al. | ......... 385/135 |
| 6,095,461 A | 8/2000 | Daoud | |
| 6,438,226 B1 | 8/2002 | Guenther et al. | |
| 7,018,229 B2 | 3/2006 | Otto et al. | |
| 2003/0185535 A1 | 10/2003 | Tinucci et al. | |
| 2004/0022013 A1 | 2/2004 | Badura | |
| 2005/0063531 A1 | 3/2005 | Arias | |
| 2005/0085119 A1 | 4/2005 | Schluter et al. | |

FOREIGN PATENT DOCUMENTS

| | | | |
|---|---|---|---|
| AU | 756261 | | 1/2003 |
| EP | 0522540 | * | 1/1993 |
| EP | 1 578 145 A1 | | 9/2005 |
| FR | 2 519 222 | | 7/1983 |
| WO | WO 03/061303 A2 | | 7/2003 |
| WO | WO 2005/094090 A1 | | 10/2005 |
| WO | WO 2006/057842 A1 | | 6/2006 |

* cited by examiner

*Primary Examiner*—Xuong M Chung Trans
(74) *Attorney, Agent, or Firm*—Janet A. Kling

(57) ABSTRACT

A carrier useful in the field of telecommunications to which a plurality of telecommunications modules are mountable. The carrier includes at least one spacer adapted to create a wire or cable slack by spacing the wires or cables from that part of the carrier on which the spacer is provided. An assembly comprising at least one carrier and at least one telecommunications module is also disclosed.

7 Claims, 4 Drawing Sheets

CARRIER AND AN ASSEMBLY INCLUDING A CARRIER AND A TELECOMMUNICATIONS MODULE

CROSS-REFERENCE TO RELATED APPLICATION

This application is a divisional of U.S. application Ser. No. 11/247,400, filed Oct. 11, 2005, now abandoned, the disclosure of which is incorporated by reference in its entirety herein.

FIELD OF THE INVENTION

The invention relates to a carrier in the field of telecommunications, an assembly of a carrier and a telecommunications module, a telecommunications module, a method of connecting wires or cables with a telecommunications module and a use of a spacer or a hinge part of a carrier or a telecommunications module.

BACKGROUND

In the field of telecommunications, numerous customers are connected with the switch of a telecommunications company over telecommunications lines. Such customers can also sometimes be referred to as subscribers. The switch is often called an exchange or "PBX" (central office exchange operated by the telecommunications company). Between the subscriber and the switch, sections of the telecommunications lines are connected with telecommunications modules. Telecommunications modules establish an electrical connection between one wire attached to the telecommunications module at a first side and another wire attached to the telecommunications module at a second side. The wires of one side can also be called incoming wires and the wires of the other side can be called outgoing wires. Plural telecommunications modules can be put together at a distribution point such as a main distribution frame (or "MDF"), an intermediate distribution frame, an outside cabinet or at some other distribution point located, for example, in an office building or on a particular floor of an office building. At such distribution points, racks can be provided on which carriers are directly mounted, allowing plural telecommunications modules to be directly attached to the carriers. To allow flexibility in wiring some telecommunications lines are connected with a set of first telecommunications modules in a manner to constitute a permanent connection. Flexibility is realized by jumpers or cross-connects, which flexibly connect contacts of the first telecommunications modules with contacts of a set of second telecommunications modules. These jumpers can be changed, for example, when a person moves within an office building to a new telephone (i.e., a different telephone line) and he or she wants to keep a former telephone number. Such a change of jumpers can be called patching or cross-connecting. Within the telecommunications module disconnection points can be located in the electrical connection between the two sides. Disconnection plugs can be inserted at the disconnection points to disconnect the line. Protection plugs and magazines are also sometimes used. They are connected to the module and protect any equipment connected to the wires from overcurrent and overvoltage. Test plugs can also be inserted at a disconnection point to test or monitor a line.

Recently, Asymmetric Digital Subscriber Line, or "ADSL" technology has spread widely in the field of telecommunications. ADSL technology allows at least two different signals to be transmitted on a single line and is achieved by transmitting the different signals at different frequencies along the line. Signals are combined at a particular point in the telecommunications line and split at another point. In particular, at the subscriber side separate voice and data signals are combined and sent to the central office over one line. In the central office the combined signal is split. The voice signal is then directed to the other subscriber(s) on the telephone call, and the data signal is directed to the other subscriber(s) participating in the data exchange. For transmission of voice and data signals to the subscriber, separate voice and data signals are combined at the central office, sent to the subscriber and split at the subscriber side. After splitting the POTS, or "plain old telephone service" can be used to transmit voice signals. The remaining portion of the split signal can be used to transmit data or other information. Splitters, which are used to split or combine the signal, can generally be arranged at any distribution point.

Any electronic components necessary to perform the above functions can be contained, sometimes together with a printed circuit board as a base, in a single splitter module. Other functional modules include protection modules, which contain components to provide protection against overvoltage and/or overcurrent, and testing and monitoring modules, which contain suitable electronic components to test and/or monitor a telecommunications line. Other functional modules or plugs are also known.

SUMMARY OF THE INVENTION

In several individual aspects, the invention provides, generally, a carrier useful in the field of telecommunications; an assembly of a carrier and a telecommunications module; a telecommunications module; a method of connecting wires or cables with a telecommunications module; and a use of a spacer or a hinge part of a carrier or a telecommunications module by which the handling of wires or cables is improved.

Thus, the invention, in one individual aspect, provides a carrier to which a plurality of telecommunications modules are mountable. The carrier has at least one spacer adapted to create a wire or cable stack by spacing the wires or cables from that part of the carrier on which the spacer is provided. In another aspect, the invention provides a use of a hinge part of a telecommunications module for guiding wires or cables.

BRIEF DESCRIPTION OF THE DRAWINGS

The invention will be described in part by reference to illustrative embodiments depicted in drawings in which.

DESCRIPTION OF PREFERRED EMBODIMENTS

Figure 1:
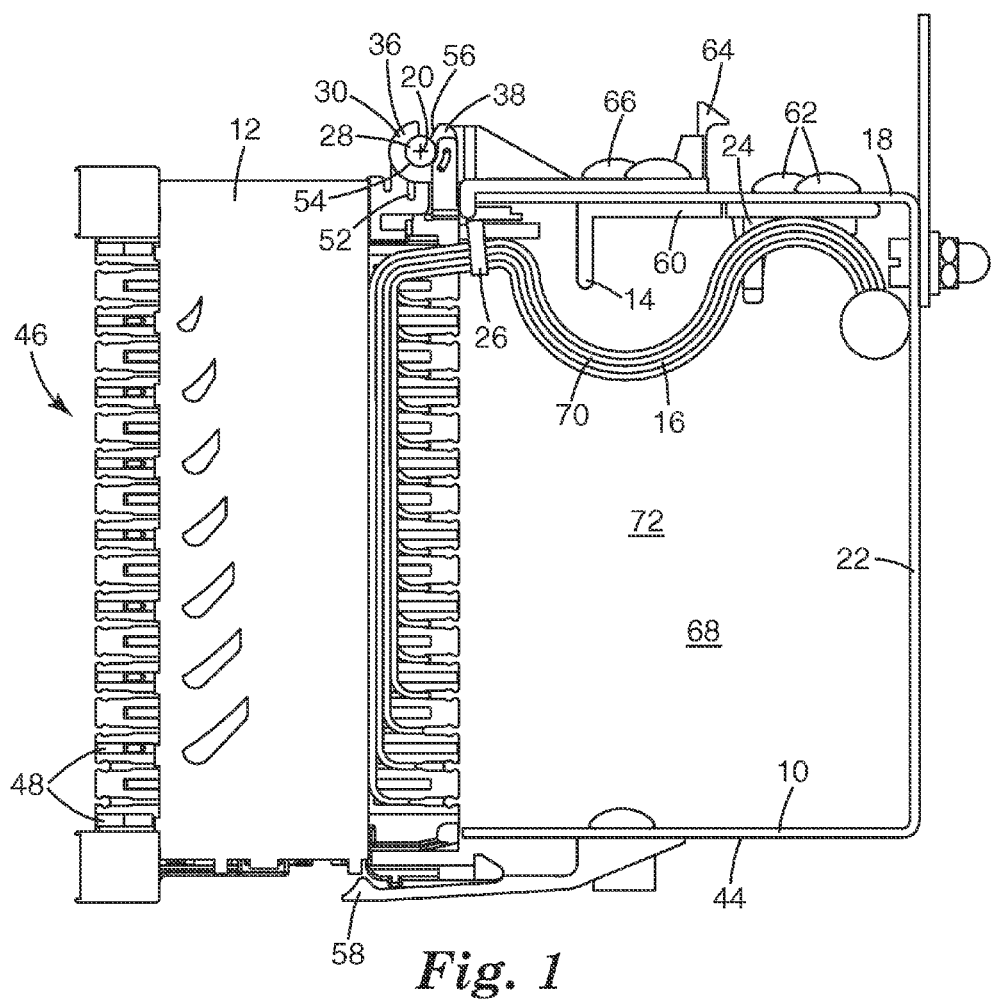
FIG. 1 shows a side view of an assembly of a carrier and a telecommunications module in a "normal", closed position.

The invention, in one aspect, provides a carrier useful in the field of telecommunications to which a plurality of telecommunications modules are mountable. The carrier can comprise one or more rails, bars, rods or wall-type elements.

When two or more of such bars, rods etc., are present, they may be parallel to allow telecommunications modules to be mounted to two or more of these components in a manner in which they are moveable along the components. The carrier may also have a trough-like appearance with two opposing sidewalls to which telecommunications modules are mountable. Alternatively, the carrier can have an essentially "L"-shaped cross-section and the telecommunications modules can be mounted to one leg of the cross-section. This leg, as well as the above-mentioned walls, can comprise openings at regular intervals to define a predetermined spacing or pitch for the telecommunications modules mounted thereon. One suitable carrier construction is offered by 3M Telecommunications of Neuss, Germany under the trade name "Flexirail" which has two parallel profiles having a cross-sectional configuration suitable for releasably mounting telecommunications modules. Any of the above-mentioned legs, walls, rails or the like can, apart from openings, comprise projections or any other suitable structures which define edges for cooperating with latching mechanisms (such as latch hooks) for mounting telecommunications modules to the carrier.

The carriers of the invention include at least one spacer adapted to, in one embodiment, create slack in a wire or cable by spacing the wires or cables from that part of the carrier on which the spacer is provided. The spacer is provided on the carrier and can be incorporated with the spacer as the carrier is produced. The spacer can alternatively be retrofitted to the carrier, for example, when the carrier has already been in use. Thus, the carrier is, independent from the type of wires or cables connected to telecommunications modules mounted on the carrier, prepared to create slack. In this context, wires are considered relatively thin, elongate metallic objects, usually with an insulation and adapted to transmit a signal. In the field of telecommunications a pair of wires usually constitute a telecommunications line. Plural wires or wire pairs can be combined to form a cable. For example, plural wires or wire pairs can be surrounded by an outer sheath. In ADSL applications a cable containing plural wires can be used to provide connection with a DSLAM. The term "cable" will be used hereinafter, and it is to be understood that this term comprises a single wire, a wire pair or any multiple of wires or wire pairs.

In the carriers of the invention wire or cable slack is created, for example, when a cable is connected with the contacts of a telecommunications module. In particular, this connection can be made in a position of the telecommunications module that differs remarkably from a "normal," operating position of the telecommunications module. A "normal" position of the telecommunications module can refer to a position the telecommunications module takes after a wire is connected and telecommunications service is provided. Slack is created by the spacer to some extent when the above-described connection is made. When the telecommunications module is returned to the normal position, the slack can become larger. For example, the telecommunications module can be pivotable relative to the carrier so that wires may be more easily connected or additional components such as protection or splitter plugs may be added. The telecommunications module may be moveable in a substantially linear direction relative to the carrier. It may also be constructed to allow for both pivotable and linear movement.

The cable or cables connected to the telecommunications module will generally assume a certain shape and will acquire a certain position after a connection is completed. When bringing the telecommunications module back to a "normal" or closed position, the spacer serves to ensure that less stress is created on the cables that could endanger the connections with the contacts of the telecommunications module. In a case where the telecommunications module is pivotable relative to the carrier, there might be, for example, a designated area such as the side walls of the carrier toward which the cables can be deformed without colliding with any other structures. In such a case the spacer can provide a longer path for the cables than would exist without it. In particular, the spacer can deform the cables somewhat toward this designated area. When the pivoting motion is carried out, therefore, the cables will reliably move toward that designated area instead of in a direction in which unwanted interference with other components could occur. The spacer may be relatively rigid to provide enough counterforce to direct the cables to the designated area and withstand any tendency of the cables to move in undesired directions. In this manner, the spacer may be provided on a particular part of the carrier, such as a sidewall, and adapted to space the cables from that part of the carrier in which the spacer is provided. The space required for the spacer is relatively small, and it can be restricted to the surroundings of the carrier. In other words, other areas of the carrier, such as an opposite sidewall, can be left substantially unaffected.

As already mentioned, the telecommunications module can pivot about a pivot axis relative to the carrier. The spacer can, moreover, be provided at a distance from the pivot axis. The pivotability of the telecommunications modules relative to the carrier allows, for example, easy access to the rear side of the telecommunications module to connect wires or other components such as protection or splitter plugs. Providing the spacer at a distance from the pivot axis can provide reliable formation of a cable slack. It may be advantageous to form the pivot axis as a hinge pin.

The carrier can have any suitable shape. Typically, however, when seen in a cross-section the carrier will have an interior with at the most two open sides. In a trough-shaped carrier with a U-shaped cross-section, for example, the interior is defined between the legs of the "U." The interior of the carrier is defined between the two parallel walls or rails define the carrier. When the carrier has an L-shaped cross-section with two opened sides, the interior is constituted by the area appearing as a triangle between the legs of the carrier when seen in cross-section. In any of the above-described configurations the spacer can be provided in the interior of the carrier. Thus, for example, in a carrier having a trough-like cross-section with a bottom and at least one sidewall the spacer can be provided on a sidewall and serve to reliably space the cables from the sidewalls to create the described slack.

The general guiding of the cables may be further improved when at least one guiding hook for guiding wires or cables is provided near the spacer. The wires or cables are affected only to a small extent when the telecommunications module is pivoted and such a guiding hook is provided near the pivot axis. This is because, as will be apparent, the pivot axis itself remains stationary when the telecommunications modules are pivoted. Thus, by guiding the cables through a guiding hook near the pivot axis, the cables will remain almost stationary near the pivot axis, and the movement of the cables along the remaining portions can be controlled by the spacer. A reduction in wire movement will generally result in fewer disconnected, broken or worn wires.

Generally, a carrier having a spacer is prepared to receive telecommunications modules and provide the advantages described above when cables are connected with the modules. Additionally, an assembly of at least one carrier and at least one telecommunications module is also to be considered as an aspect of the invention. A guiding hook can also be provided on the telecommunications module either when it is manufactured at the some later time to further improve the general guiding of the cables.

According to a further aspect, the invention provides a use of a spacer provided on a carrier to which a plurality of telecommunications modules are mountable. Use of the spacer creates wire or cable slack by spacing the wires or cables from that part of the carrier on which the spacer is provided.

The invention also generally relates to the handling of wires or cables connected with telecommunications modules. As will be apparent from the above, the general guiding and movement of cable is improved when connections are completed and the telecommunications module is returned to its "normal" position. The invention also provides a telecommunications module having a hinge part adapted to receive a hinge pin for forming a hinge and for mounting the telecommunications module to a carrier in a pivotable manner, wherein the hinge part is adapted to guide wires or cables. The telecommunications module can have a housing that may be made of plastic or any other suitable material and can be constituted by one or more components. The housing serves to accommodate telecommunications contacts to which telecommunications lines are connectable. The housing can also have specific structures for positioning the contacts. Moreover, the housing can comprise one or more cavities or receiving spaces adapted to accommodate the contacts and/or objects such as one or more protection modules or other module or module parts. Finally, the housing can comprise suitable structures, typically on the outside, to enable the telecommunications module to be mounted to a rack or any other suitable carrier.

The telecommunications modules include telecommunications contacts to which telecommunications lines are connectable. A telecommunications line will normally be constituted by a pair of wires, so telecommunications contacts are also typically arranged in pairs. Telecommunications modules are known in which the telecommunications contacts are arranged in two or more parallel rows, with pairs of contacts located opposite each other. Thus, the telecommunications modules can have the shape of a strip.

In connection with the hinge, the hinge pin can, for example, be provided on the carrier. The telecommunications modules have a hinge part, which can have any suitable shape and structure to receive the hinge pin. The hinge part can, for example, be a hollow cylinder for receiving the hinge pin. In this case, the interior of the cylinder can be sufficiently large to accommodate not only the hinge pin, but also the wires or cables. The wires or cables could be guided through the hinge pin itself, so that they are "indirectly" guided through the (complementary) hinge part. The hinge part cooperating with a hinge pin can also have one or more legs containing a slit or other type of suitable recess or widened area for receiving the hinge pin. The slit and/or the recess can be adapted to guide additionally received cables or wires. The wires or cables can be guided between two legs of the hinge part. The embodiments can have a discontinuous hinge. Such a hinge is not continuous along the pivot axis. Rather one or more recesses or gaps are present, such as between two legs of a U-shaped hinge part. The wires can essentially pass through the recesses where the hinge is discontinuous.

In any case, by guiding the wires or cables through the hinge part, the wires or cables are guided through a location that is substantially unaffected by pivotal movement of the telecommunications module allowed for by the hinge. Thus, pivotal movement of the telecommunications module will at least not substantially move or deform the wires or cables at the hinge. Their connection with the contacts of the telecommunications module is also not substantially affected during pivotal movement, and the general handling can thereby be improved.

In a preferred embodiment the hinge part has at least one U-shaped portion with legs. Wires or cables can be guided between the legs. At least one leg can be formed by two leg portions, which are adapted to enclose the hinge pin. In this way a slit can be present between the leg portions. They can be adapted to enclose the hinge pin by forming the slit with a widened area on one or both leg portions so that a recess is created which is substantially complementary to the hinge pin and adapted to accommodate it.

The above-described telecommunications modules may be combined with a carrier to form an assembly in which the advantages described above can be realized. Also in this case, the general guiding of the wires or cables can be further improved when the carrier additionally has at least one guiding hook. Movement and deformations of the wires or cables can be substantially limited when a guiding hook is provided near the hinge.

The advantages of the invention are particularly evident when an assembly of the invention further includes at least one splitter module. A splitter module, for example a splitter plug, advantageously provides ADSL services. The fitting of splitter modules to the assembly can require the telecommunications module to be moved from its "normal" position to, for example, a pivoted position to install the splitter module.

The handling of the wire and cables can be further improved when the carrier has a bottom in which, as seen in a cross-section, a U-shaped portion is formed. This portion provides a kind of recessed channel in the bottom of the carrier and can, for example, be used to accommodate a DSLAM cable. Thus, any interference between the DSLAM cable and other cables or components present in the interior of the carrier can be restricted. In particular, such a structure provides a demarcation between the DSLAM cable, on the one hand, and POTS (Plain Old Telephone Service) and line cables, on the other. This generally provides a well-organized structure, in particular, when ADSL services is provided. Such a U-shaped portion can be provided in any type of carrier, including those without a spacer or hinge pin. Thus, any carrier in the field of telecommunications having a bottom in which, as seen in a cross-section, a U-shaped portion is formed is considered subject matter of the invention. The width and/or a depth of the U-shaped portion is preferably small compared to a width or a depth, respectively, of the bottom.

The invention also provides a method of connecting wires or cables with a telecommunications module where the telecommunications module has a hinge part and the wires or cables are guided through that hinge part. The hinge part can have any of the above-described structures. The method provides efficient and reliable guiding of wires or cables. Corresponding to the above-described modifications of the carriers, telecommunications modules and assemblies, further advantages may be realized when the cables are additionally guided through at least one guiding hook provided on the telecommunications module and/or the carrier. This also applies to the provision of a U-shaped portion provided in a bottom of a carrier, which is adapted to mount telecommunications modules thereon.

FIG. 1 shows an assembly of a carrier 10 and a telecommunications module 12 which is mounted to the carrier. The carrier 10 has a trough-like cross-section with a bottom 22 and two sidewalls 18 and 44. The view of FIG. 1 corresponds to one possible orientation in which the assembly including the carrier 10 and the telecommunications module 12 can be used in a rack or cabinet in the field of telecommunications. In particular, the carrier 10 with the trough-like cross-section can be open toward a front side 46. The carrier can have an extension perpendicular to the drawing of FIG. 1 which can be oriented substantially horizontal so that FIG. 1 corresponds to a side view. The carrier could also, however, be oriented substantially vertically. In this case, FIG. 1 would correspond to a top or bottom view.

In the embodiment shown, the telecommunications module 12 is mounted to the carrier 10 on a front side 46. Telecommunications contacts 48 are exposed on the front side of the telecommunications module 12 in order to connect wires (not shown). Telecommunications contacts 50 are exposed on a rear side 72 to connect wires 16 from the rear side. The telecommunications module 12 is, moreover, mounted to the carrier 10 in a pivotable manner. For this purpose, a pivot axis 20 is provided on the carrier. The telecommunications module 12 has a hinge part 30 as described in more detail below with reference to FIGS. 4 and 5. As can be seen already in FIG. 1, the hinge part 30 has two leg portions 36 and 38 with a slit 52 between them. The slit 52 has, in an area relatively close to the free ends of the legs portions 36, 38, a widened area 54 adapted to receive the hinge pin 28. The widened area 54 is essentially formed in the rear arm portion 38 alone. It could also, however, be formed in the front arm portion 36 alone, or in both arm portions 36, 38. An entrance area 56 between the free ends of the arm portions 36, 38 is smaller than the widened area 54, and the arm portions 36, 38 are somewhat flexible. Thus, when the telecommunications module 12 is mounted to the carrier, the hinge pin 28 can enter the entrance area 56, the arm portions 36, 38 can deflect somewhat, and the telecommunications module 12 can be brought into a position in which the hinge pin 26 is accommodated in the widened area 54.

It will be noted that further telecommunications modules 12 can be present "in front of" or "behind" the plane of the drawing of FIG. 1 to constitute a block. Thus, the entire block of plural telecommunications modules can be pivotable relative to the carrier 10 and only some or all of the telecommunications modules 12 can be provided with the above-described hinge part to provide the pivotable mounting to the carrier. At the opposite side a latch hook 58 made of, for example, flexible plastic is provided on the carrier 10 to releasably secure the telecommunications module 12 or a block of plural telecommunications modules.

In the embodiment shown wires 16 can be connected at the rear side 72 of the telecommunications module. These wires 16 are generally accommodated near the bottom 22 of the carrier and need to be guided to the rear side 72 of the telecommunications module 12. For this purpose a first guiding hook 24 is provided on a sidewall 18 relatively close to the bottom 22 of the carrier 10. Somewhat closer to the hinge pin 28, the embodiment shown comprises a spacer 14. The effect of the spacer will be described in more detail with reference to FIG. 2. The spacer 14 is constituted by a piece of relatively rigid material, such as plastic, that extends for a distance between several millimeters and a few centimeters from the sidewall 18. However, the spacer 14 can, alternatively, be somewhat flexible or deformable. For example, the spacer can deform at a force that is lower than a force necessary to break or disconnect the wires. Thus, the wires can be arranged relatively tightly across the spacer. As, in this embodiment, the spacer can deform, it will do so without harming the wires or the electrical connections in any manner. Moreover, a flexible spacer can be beneficial if the wires are connected to the telecommunications module in a state in which the telecommunications module is not fully opened. When the telecommunications module is fully opened at a later point in time, interference between the wires and a rigid spacer might cause the electrical connections to break. This risk can be reduced, however, if the spacer is somewhat flexible or deformable.

Figure 2:
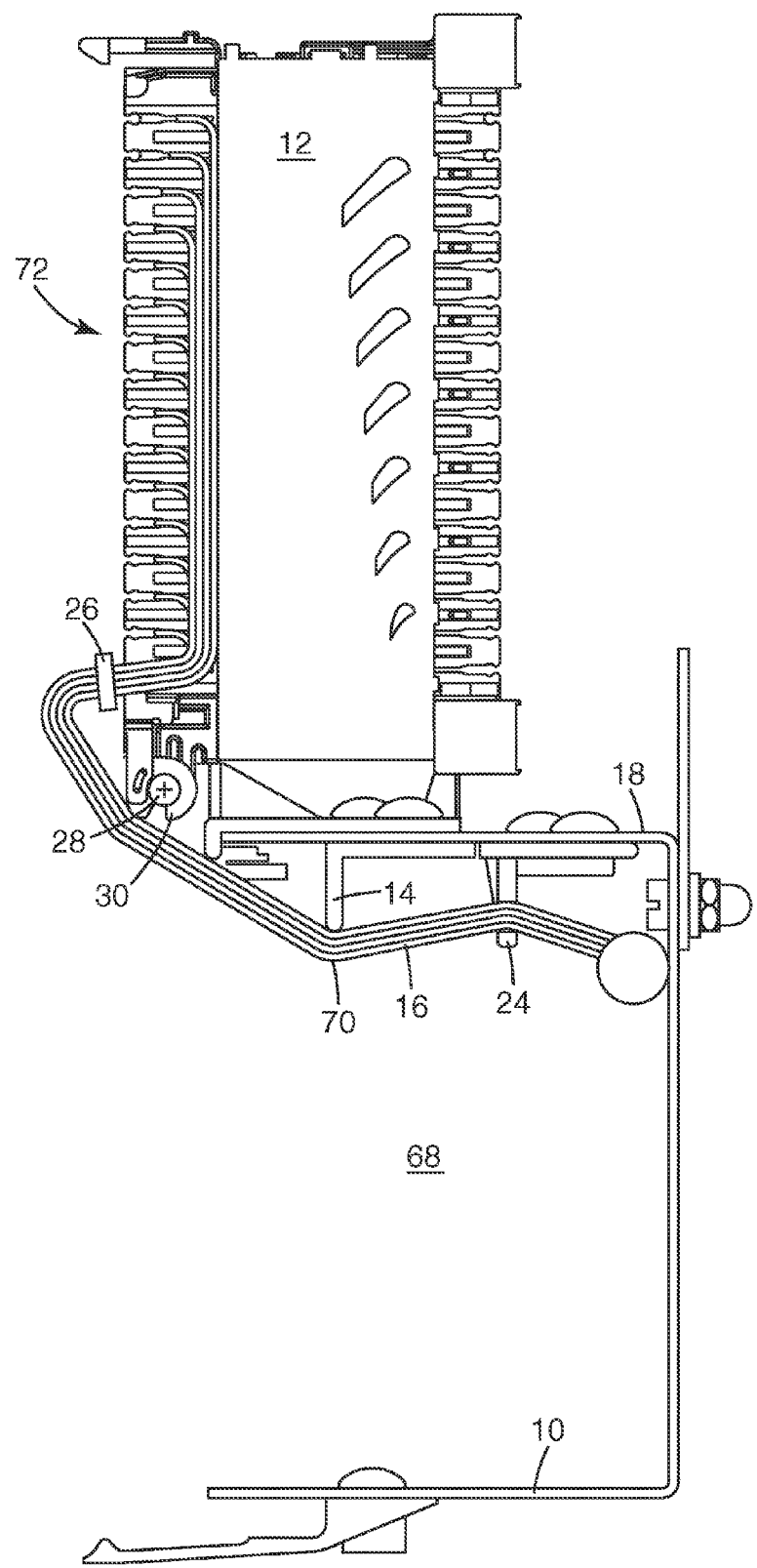
FIG. 2 shows the assembly of FIG. 1 in a pivoted, open position.

In the embodiment shown, the spacer 14 and the guiding hook 24 are integrated in a single piece 60 which is fixed to the sidewall 18 by rivets 62. The spacer 14 and the guiding hook 24 can also, however, be provided on separate pieces. The embodiment shown further comprises a second guiding hook 26 near the hinge pin 28. The guiding hook 26 is provided on the telecommunications module 12. Due to the position of the guiding hook 26 (i.e., near the hinge pin 28), the wires 16 will move to a small extent only when the telecommunications module 12 is pivoted to the open position as shown in FIG. 2. The embodiment further has a hook 64 provided on the outside of sidewall 18, which is integrated in a piece which also has the hinge pin 28. This piece is fixed to the sidewall 18 by rivets 66.

As shown in FIG. 1, the hook 64 serves to hold the telecommunications module 12 in the open position. The opened position may be used to connect the wires 16 with the telecommunications contacts 50 at the rear side of the telecommunications module. Due to the approximately 180° pivoting motion, the rear side 72 is now exposed and the connection step can be carried out conveniently. FIG. 2 also shows the effect of the spacer 14. The spacer 14 serves to space the wires 16 from the sidewall 18 of the carrier on which the spacer 14 is provided. This deforms or deflects, already in the open state shown in FIG. 2, the wire 16 somewhat toward the interior 68 of the carrier. In particular, a bending, bulge or slack 70 is created in the wire 16 by the interaction between the spacer 14 and the first guiding hook 24. The first guiding hook 24 keeps the wires 16 relatively close to the sidewall 18 and the spacer 14 spaces the wire 16. Thus, when the telecommunications module 12 is moved from the position of FIG. 2 back to the "normal," closed position shown in FIG. 1, the wires 16 will deform toward the interior 68 of the carrier to create the slack 70. FIG. 1 shows the slack 70 which avoids any adverse stress on the wires 16 that could endanger the connection with the telecommunications contacts 50.

Figure 3:
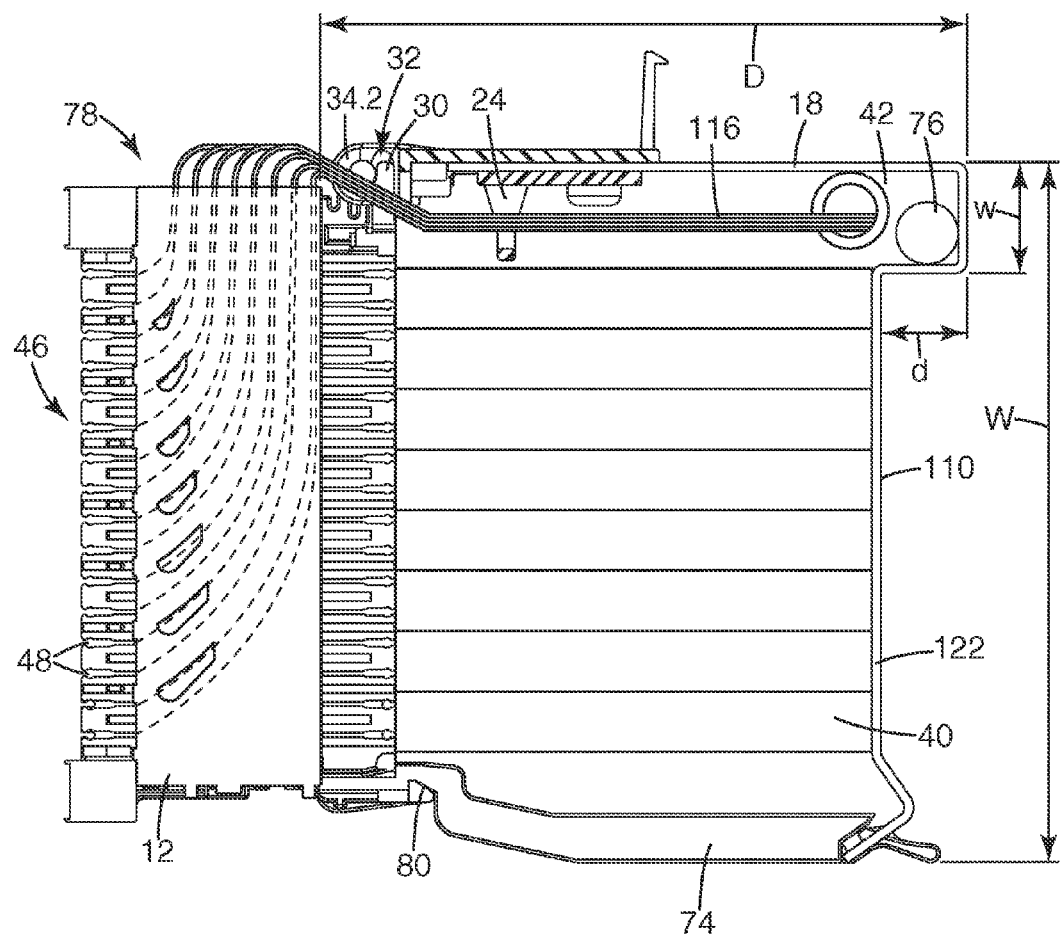
FIG. 3 shows a side view of a second embodiment of an assembly of a carrier and a telecommunications module in a closed position.

FIG. 3 shows a further embodiment of an assembly including a carrier 110 and a telecommunications module 12. The telecommunications module 12 is essentially identical to the telecommunications module 12 of the embodiment of FIGS. 1 and 2. However, the carrier is constructed differently. In particular, the carrier 110 can be formed as described in the Applicant's EP 04 006 530 and WO 2005/094090, the disclosure of which regarding the carrier and the telecommunications module is incorporated herein by reference.

This particularly applies to an adapter 74, which connects the telecommunications module 12 with a bottom 122 of the carrier 110. In particular, the adapter 74 can be released from the carrier 110 and can, together with the telecommunications module 12, be pivoted about a hinge 32 including hinge part 30 provided on the opposite side (i.e., the upper side according to FIG. 3). In particular, the adapter 74 replaces sidewall 44 of the carrier shown in FIGS. 1 and 2. In the embodiment of FIG. 3, the carrier 110 has substantially an L-shaped cross-section with bottom 122 and sidewall 118. Moreover, in the embodiment shown, a U-shaped portion 42 is provided in the bottom 122 adjacent sidewall 118. Both the depth (d, seen in a horizontal direction in FIG. 3) and the width (w, seen in a vertical direction in FIG. 3), of the U-shaped portion 42 is small compared to the depth D and width W of the bottom 122 respectively. For example, the U-shaped portion 42 can have a width which corresponds to approximately 20% of the width of the bottom 122. This also applies to the depth of the U-shaped portion. The depth of the bottom 122, and more generally the depth of the carrier 110, corresponds to a distance between the end of the sidewall 118 (i.e., near the hinge 32 including hinge part 30) and the bottom 122. The U-shaped portion 42 can advantageously be used to accommodate a DSLAM cable 76. Due to the U-shaped portion 42, the DSLAM cable 76 is advantageously separated from other cables or wires 16 to avoid interference and clearly separates cables for which different providers might be responsible from each other.

In the embodiment shown in FIG. 3, a guiding hook 24 is provided relatively close to the hinge 32. The hinge 32 is formed generally identical to the hinge of the embodiment of FIGS. 1 and 2. However, as shown in FIG. 3, wires 116, which are connected with telecommunications contacts 48 at the front side 46, are guided through the hinge 32. This will be described in more detail below with reference to FIGS. 4 and 5. In the embodiment shown, the wires 116 are inserted into wire guides that are open at a top 78 and are guided by wire guides to the telecommunications contacts 48. As the wires guides as such will be known to those skilled in the art, a detailed description is not necessary (see for example the applicant's EP 05 000 346 filed Jan. 10, 2005 and WO 03/061303 A2). FIG. 3 shows an embodiment of an assembly that further comprises plural splitter modules 40 fitted to the rear side 72 (see FIG. 1) of the telecommunications module 12. In this embodiment, the splitter modules 40 extend between the rear end of the telecommunications module 12 and the bottom 122 of the carrier 110. Thus, the U-shaped portion 42 is particularly efficient to avoid interference between, for example, a DSLAM cable 76 and the splitter modules 40.

As regards the hinge 32 and the guiding of the wires 116 through the hinge, FIG. 3 shows in the area of the hinge 32 a sectional view to illustrate the wires located between two legs 34 (see FIG. 5) of the hinge part 30 of the telecommunications module 12. According to the Figure, a first leg 34.1 which would be closer to the view of FIG. 3, is not visible. As can be seen, the wires 116 are guided between legs 34 so they appear in front of the second leg 34.2 which is more remote according to the view of FIG. 3 and, therefore, visible in the figure.

Figure 4:
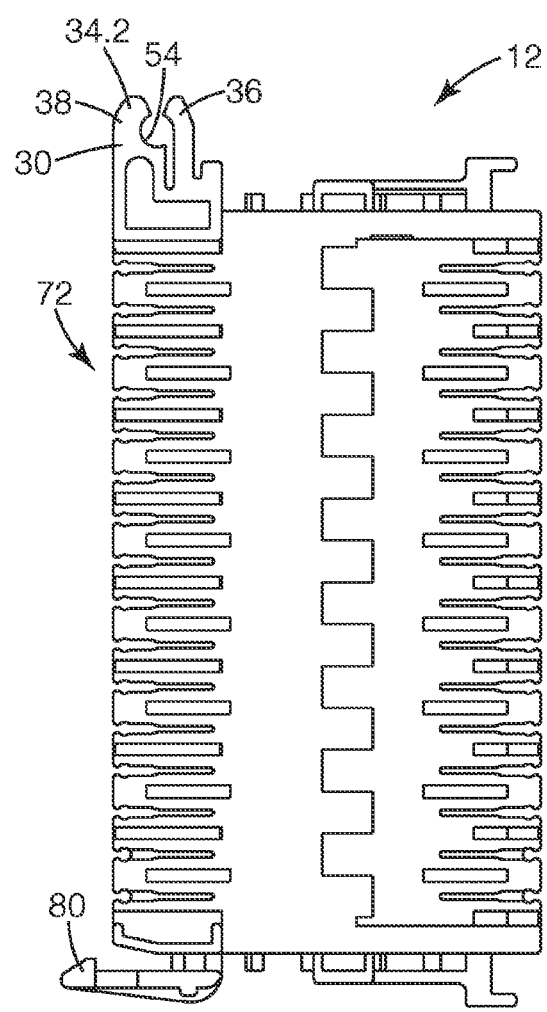
FIG. 4 shows a side view of the telecommunications module of FIG. 3.

FIG. 4 shows, for the sake of completeness, the telecommunications module including the hinge part 30. In the embodiment shown, the hinge part 30 is integral with the housing of the telecommunications module which can, for example, be made of plastic. The hinge part 30 comprises two legs 34, each of which comprises two leg portions 36, 38 as described above with reference to FIG. 1. FIG. 4 also shows a latch hook 80, which can serve to secure the adapter 74 (see FIG. 3).

Figure 5:
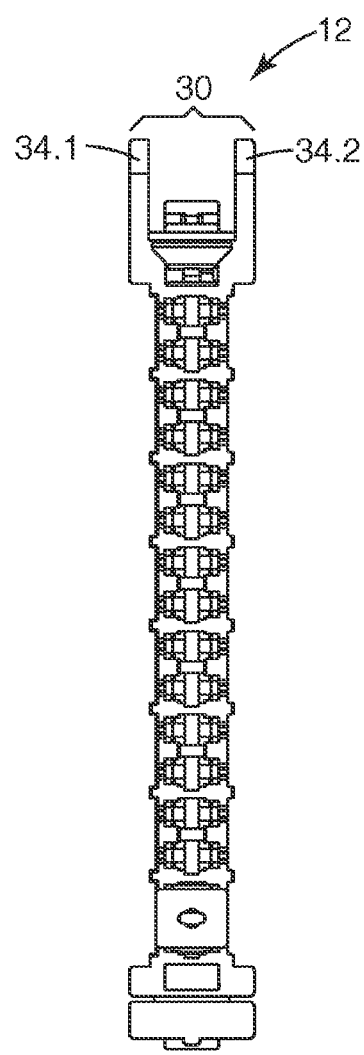
FIG. 5 shows a rear view of the telecommunications module of FIG. 4.

Finally, FIG. 5 shows the legs 34 of a generally furcated hinge part 30. In this embodiment, two legs 34 are substantially parallel. Wires 116 (see FIG. 3) can be guided between the legs 34. Wires 116, which are connected with telecommunications contacts 48 at the front side 46, can be guided through the hinge part 30 as shown in FIG. 3, whereas wires 16, which are connected with telecommunications contacts 50 at the rear side 72, can be guided and/or spaced as shown in FIG. 1. Thus, any features described with regard to only one embodiment above, can also be applied to another embodiment.

The present invention has now been described with reference to specific illustrated embodiments. The foregoing detailed description and embodiments have been given for clarity of understanding only. No unnecessary limitations are to be inferred from this description. For example, all references to left and right sides, upper, lower, front and rear levels, horizontal and vertical directions etc., are exemplary only and do not limit the claimed invention. It will be apparent to those skilled in the art that many changes can be made to the embodiment described without departing from the spirit and scope of the invention. Thus, the scope of the present invention should not be limited to the exact details and structures described herein, but rather by the structures described by the language of the claims and the equivalents of those structures.

We claim:

1. A telecommunications module comprising a hinge part configured to receive a hinge pin for forming a discontinuous hinge having an internal recess for passing wires; wherein the wires are from at least one of a DSLAM cable, Pots cable and a line cable, and for mounting the telecommunications module to a carrier in a pivotable manner, wherein the hinge pin defines a pivot axis, wherein the hinge part is a furcated hinge part comprising at least two spaced apart legs, and wherein the hinge part is configured to guide the wires between the spaced apart legs in a direction that is substantially perpendicular to the pivot axis and passing through the pivot axis from a the rear side of the telecommunication module to a front side of the telecommunication module where the wires are electrically connected to the front side of the telecommunication module and at least one splitter module attached to the rear side of the telecommunications module.

2. The telecommunications module according to claim 1 wherein at least one leg is formed by two leg portions which are configured to enclose the hinge pin.

3. An assembly of at least one carrier and at least one telecommunications module according to claim 1, wherein the carrier comprises a bottom connected to a side wall and where the telecommunication module is pivotally connected a pivot axis disposed on the side wall opposite the bottom wall.

4. The assembly according to claim 3 wherein the carrier has at least one guiding hook.

5. The assembly according to claim 3 wherein the carrier has a bottom in which, as seen in a cross-section, a U-shaped portion is formed.

6. The assembly according to claim 4 wherein the guiding hook is provided near the hinge.

7. The assembly according to claim 5 wherein at least one of a width and a depth of the U-shaped portion is small compared to at least one of a corresponding width and a corresponding depth of the bottom of the carrier.

* * * * *

UNITED STATES PATENT AND TRADEMARK OFFICE
CERTIFICATE OF CORRECTION

Page 1 of 1

PATENT NO. : 7,828,567 B2
APPLICATION NO. : 11/782406
DATED : November 9, 2010
INVENTOR(S) : Pierre Bonvallat It is certified that error appears in the above-identified patent and that said Letters Patent is hereby corrected as shown below:

Column 10,
Line 32, delete "from a the rear side" and insert in place thereof --from a rear side--.

Signed and Sealed this
Twenty-ninth Day of March, 2011

David J. Kappos
*Director of the United States Patent and Trademark Office*